(12) United States Patent
Benner et al.

(10) Patent No.: US 6,211,466 B1
(45) Date of Patent: Apr. 3, 2001

(54) SWITCHING CABINET

(75) Inventors: Rolf Benner; Martina Köhler, both of Herborn; Udo Münch, Sinn; Wolfgang Reuter, Burbach, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/308,298

(22) PCT Filed: Nov. 6, 1997

(86) PCT No.: PCT/EP97/06150

§ 371 Date: May 17, 1999

§ 102(e) Date: May 17, 1999

(87) PCT Pub. No.: WO98/23012

PCT Pub. Date: May 28, 1998

(30) Foreign Application Priority Data

Nov. 19, 1996 (DE) ............................................. 196 47 726

(51) Int. Cl.[7] .................................................. H02G 3/14
(52) U.S. Cl. ............................................. 174/66; 220/241
(58) Field of Search ................ 174/66, 67; 220/241, 220/242; 312/265.2, 265.5, 265.6, 109, 270.2, 249.7

(56) References Cited

U.S. PATENT DOCUMENTS

| 4,823,381 | * | 4/1989 | Olson ................................. 379/399 |
| 5,641,215 | * | 6/1997 | Pochet ................................ 312/109 |
| 5,806,946 | * | 9/1998 | Benner et al. ...................... 312/265.3 |
| 5,866,845 | * | 2/1999 | Markiewicz et al. ................ 174/57 |
| 5,971,515 | * | 10/1999 | Baker et al. ........................ 312/329 |
| 6,012,791 | * | 1/2000 | Benner et al. ...................... 312/265.2 |
| 6,024,236 | * | 2/2000 | Jannot et al. ....................... 220/4.02 |
| 6,031,183 | * | 2/2000 | Guerrieri ............................. 174/67 |
| 6,037,542 | * | 3/2000 | McCall ................................ 174/66 |
| 6,070,307 | * | 6/2000 | Kawanabe .......................... 24/57 |

FOREIGN PATENT DOCUMENTS

| 675 025 | 4/1939 | (DE) . |
| 21 31 772 | 11/1972 | (DE) . |
| 84 32 777 U1 | 4/1985 | (DE) . |
| 0 551 971 | 7/1993 | (EP) . |
| 573367A1 | * 12/1993 | (EP) ............................... 174/66 |
| 0 630 088 | 12/1994 | (EP) . |
| 2 030 686 | 11/1970 | (FR) . |
| 2 123 065 | 9/1972 | (FR) . |
| 2 701 607 | 8/1994 | (FR) . |
| 2 711 857 | 5/1995 | (FR) . |
| 54-090540 | 7/1979 | (JP) . |

* cited by examiner

Primary Examiner—Kristine Kincaid
Assistant Examiner—Dhiru R Patel
(74) Attorney, Agent, or Firm—Pauley Petersen Kinne & Fejer

(57) ABSTRACT

A switching cabinet having a cabinet door pivotably fixed by hinges. The distance between the top side of the switching cabinet and the upper horizontal edge of the cabinet door is fitted with a covering element. The visual aspect of the switching cabinet is improved simply by ensuring that the covering element is secured to a holding device on the cabinet door.

12 Claims, 2 Drawing Sheets

SWITCHING CABINET

BACKGROUND OF THE INVENTION

1. Field of the Invention

This invention relates to a switchgear cabinet, to which a cabinet door is hinged, wherein a section between the upper side of the switchgear cabinet and the upper horizontal edge of the cabinet door is at least partially covered by a covering element.

2. Description of Prior Art

A switchgear cabinet of this type is known from European Patent Reference EP 0,551,971 A1. In this case, the cabinet door contains a horizontal angled section on its upper edge. An adhesive strip, such as one of the two strips of a Velcro™ closure, can be attached to the upper surface of this angled section. A decorative strip can then be fixed thereto.

The decorative strip is realized in the form of an angular profile with two lengths that extend perpendicular to one another. A second strip, the second Velcro™ strip, is arranged on the underside of the horizontal length. The two strips are connected such that they adhere to one another in order to attach the decorative strip to the angled section. Consequently, the vertical length of the decorative profile partially covers the front side of the cabinet door. The cabinet doors of large switchgear cabinets in particular are relatively heavy, for example, the upper edge of such cabinet door are not horizontally aligned. When closed the cabinet door has an unsightly appearance and the locking device of the cabinet door may not function properly.

A segmented cabinet door is known from French Patent Reference FR 2,711,857. In this case, the cabinet door segments are realized in the form of plates that are connected to one another via plug-like type connections.

Another switchgear cabinet is known from German Patent Reference DE 8,432,777 U1, for example. Such switchgear cabinets contain a frame that is composed of frame pieces. The upper horizontal frame piece contains an open plug receptacle that faces the cabinet door. A plug-like projection of the covering element can be inserted into this plug receptacle. The covering element has a sealing lip that rests on an inwardly angled edge of the cabinet door to form a seal.

A right/left limit stop is frequently provided for the cabinet door. Depending on the intended use, the hinges can be arranged on the cabinet door such that the door can swing open to the left or the right. The lower horizontal edge of the cabinet door must be high enough off the ground so that a swinging motion of the door is not impaired by objects lying on the ground. In addition, it is frequently required that the hinges be arranged symmetrically on the fame. However, since the cabinet door should, if possible, cover an entire front of the switchgear cabinet, the hinges are arranged on the cabinet door asymmetrically relative to the horizontal center line of the cabinet door. This does not present a problem if a basic design of the switchgear cabinet is used, for example, a design in which a left limit stop is provided for the cabinet door. When changing the opening direction of the cabinet door to a right limit stop, an unsightly gap is formed on the top of the switchgear cabinet. The bottom of the cabinet door is located too close to the ground. In order to solve this problem, it was attempted to shorten the cabinet door by a short section at the top and on the bottom. Consequently, unsightly transitions are formed on the upper as well as the lower edge of the cabinet door.

SUMMARY OF THE INVENTION

This invention is based on one objective of developing a switchgear cabinet of the initially mentioned type such that the appearance is improved and the cabinet door can always be securely closed.

This objective is achieved because the covering element contains a spacer that moves onto a sliding surface of the switchgear cabinet when closing the cabinet door.

The covering element may be used to cover the section between the upper side of the switchgear cabinet and the upper horizontal edge of the cabinet door in order to produce an aesthetically appealing appearance. The cabinet door can always be aligned in a predetermined position when it is closed due to the fact that the covering element contains a spacer that moves onto a sliding surface of the switchgear cabinet when the cabinet is closed. In this way, the cabinet door is aligned with the cabinet door locks. In addition, a definite seal of the cabinet door can always be ensured. If sealing elements are arranged on the inner side of the cabinet door, for example, the sealing elements are always moved into the correct position relative to the corresponding contact surfaces of the switchgear cabinet.

According to one preferred embodiment of this invention, the upper horizontal edge of the cabinet door has an angled section that forms the holding element for the covering element, wherein the covering element contains a mating slot for the angled section. Thus, the covering element can easily be slipped onto the angled section, thereby significantly simplifying mounting of the covering element.

An attachment of the covering element onto the cabinet door without play can thus be realized if the insertion of the angled section into the receptacle of the covering element is limited by a limit stop and if the covering element is positively held on the cabinet door by means of a connecting element and a connecting element receptacle.

The alignment of the cabinet door is simplified if the sliding surface makes a transition into an inclined surface on the side which faces the switchgear cabinet, so that the inclined surface moves onto a horizontal edge of a frame piece that forms part of the frame.

In order to attain an additional sealing effect, the spacer may adjoin the switchgear cabinet in sealing fashion.

In another embodiment of this invention, the covering element contains a lettering strip receptacle, into which a strip-shaped lettering carrier and/or a water-proof film is inserted.

In order to divert rainwater that collects on an upper side of the switchgear cabinet and drains between the cabinet door and the switchgear cabinet, this invention provides a covering element with a first feed device that diverts accumulating rain or splashed water into a collection channel of the switchgear cabinet. In this case, the collection channel may be connected to the cover that closes the upper side of the switchgear cabinet or arranged directly on the frame piece. In this case, the covering element preferably contains a downwardly directed second feed device and an upwardly directed endpiece that is connected to the second feed device in angled fashion. Consequently, the endpiece and the feed device form a channel in which the collected water drains, for example, no rainwater can accumulate on the cabinet door.

BRIEF DESCRIPTION OF THE DRAWINGS

This invention is described in greater detail below with reference to embodiments illustrated in the drawings wherein.

DESCRIPTION OF PREFERRED EMBODIMENTS

Figure 1:
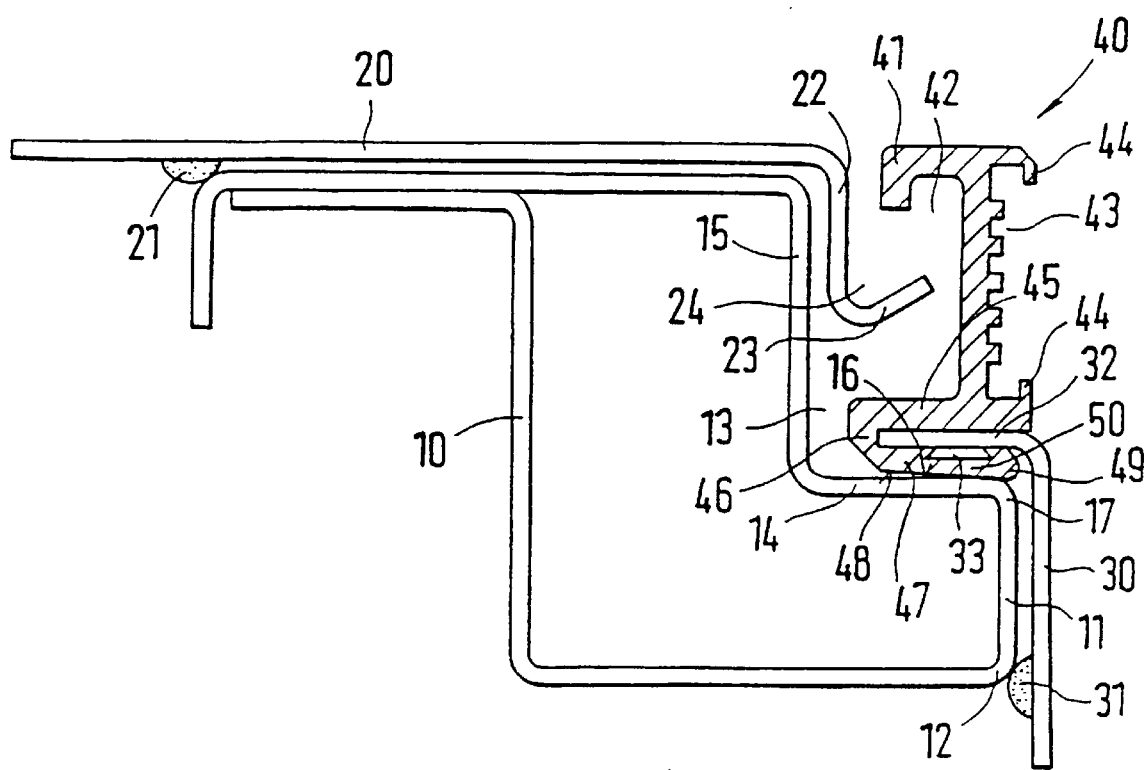
FIG. 1 is a partial section view taken through a corner region of a switchgear cabinet with a covering element attached to the cabinet door.

According to FIG. 1, the switchgear cabinet is formed by a frame that comprises frame pieces 10. Here, twelve identical frame pieces 10 may be used for forming a cuboidal switchgear cabinet interior, wherein it would also be conceivable to utilize different profile cross sections for the horizontal and vertical frame pieces 10. The frame piece 10 shown in the FIG. 1 is arranged on the front side of the switchgear cabinet. A cover 20 is used for closing the interior of the switchgear cabinet on the top. The cover 20 has a seal 21 that adjoins a sealing edge of the frame piece 10. The cover 20 is connected to the frame piece 10 by means of screw connections. Toward the front side of the switchgear cabinet, the cover 20 makes a transition into a downwardly angled vertical web that forms a feed device 22. An endpiece 23 extends at an angle upward from the feed device 22. The feed device 22 and the endpiece 23 form a collection channel 24. The front side of the switchgear cabinet can be closed by means of a cabinet door 30. Adjacent to a door panel, the cabinet door 30 has an angled section that serves as a holding element 32. A covering element 40 can be slipped onto the holding element 32. The covering element 40 has a mating slot for this purpose. This receptacle is formed by a foot 45 and a spacer 47. The insertion of the holding element 32 into the mating slot is limited by a limit stop 46. A connecting element 33 is fitted onto the cabinet door 30 in order to fix the covering element 40 to the cabinet door 30. The spacer 47 contains a connecting element receptacle 50.

The mounting is realized by pushing the covering element 40 onto the holding element 32. Here, an inclined surface 49 which faces the cabinet door 30 is arranged on the spacer 47. The inclined surface slides onto the edge of the holding element 32 and causes a downward excursion of the spacer 47. As soon as the holding element 32 makes contact with the limit stop 46, the connecting element 33 snaps into the connecting element receptacle 50. However, it is also possible to fix the covering element 40 to the cabinet door 30 in other ways. In this respect, it is important that the covering element 40 be held in such a way that the covering element 40 is not pulled off the holding element 32 when the cabinet door 30 is opened.

When the cabinet door 30 is closed, the spacer 47 slides onto a horizontal edge 17 of the frame piece 10 with an inclined surface 48. A seal 31 is arranged on an inner side of the cabinet door 30 at a defined distance from the spacer 47. The spacer 47 serves to adjust the vertical distance to the seal 31. While the cabinet door 30 is closed, the seal 31 always adjoins a sealing edge 12 of the frame piece 10. An upwardly directed contact web 11 transitions into the angled section 14 and the angled section 15 is arranged adjacent to the sealing edge 12. The angled section 14 and the angled section 15 form a receptacle 13, wherein the covering element 40 now rests in the receptacle 13. The covering element 40 now covers the section located between the upper side of the switchgear cabinet and the cabinet door 30 such that the appearance is aesthetically pleasing. The covering element 40 contains a lettering strip receptacle 43 in order to attach a lettering strip or the like. The lettering strip can be laterally inserted into the receptacle 13 so that it is held by holding elements 44.

The lettering strip receptacle 43 transforms into a downwardly directed feed device 41 via a horizontal web. The feed device 41 and the feed device 22 of the cover 20 divert accumulated rainwater into the collection channel 24. Since the endpiece 23 protrudes into a receptacle space 42, it is ensured that the feed device 41 of the covering element 40 always diverts rainwater reliably into the collection channel 24.

In the embodiment shown, the covering element 40 covers the entire region between the upper side of the switchgear cabinet and the cabinet door 30. However, it would also be conceivable that the covering element 40 only covers part of this section. In this respect, it is important to achieve an aesthetically pleasing appearance: the covering element 40 should cover unsightly transitions within an edge region of the switchgear cabinet.

Figure 2:
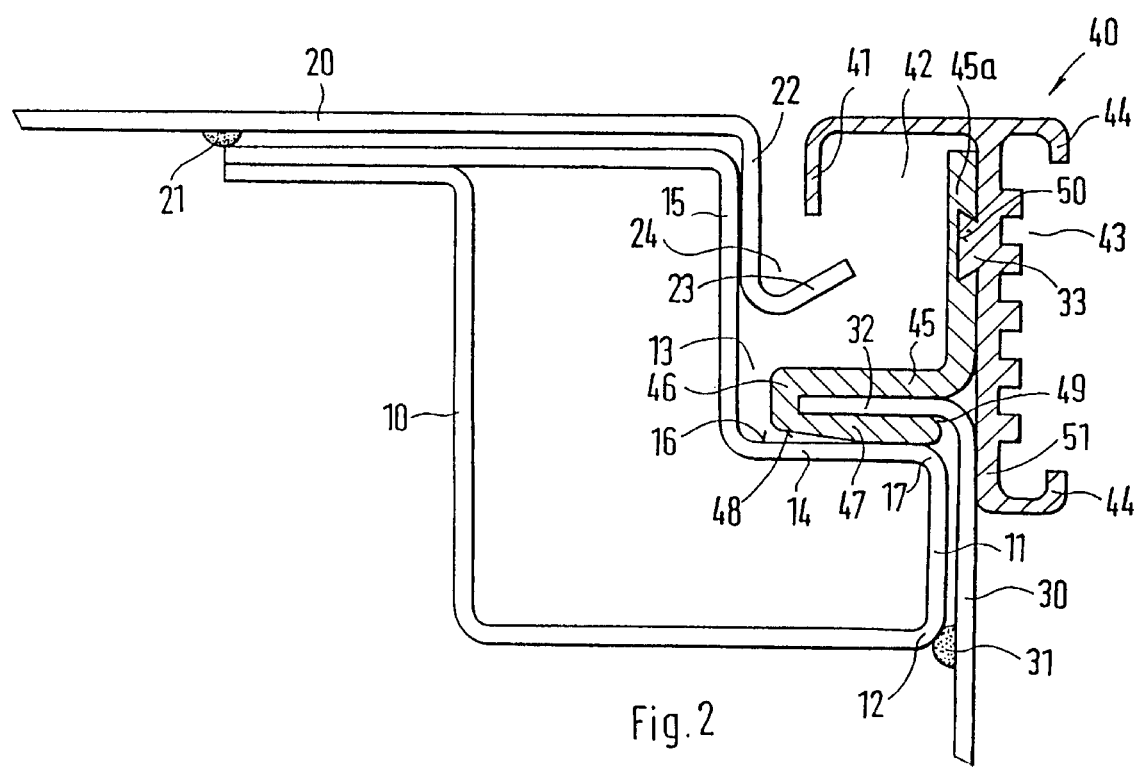
FIG. 2 is a partial section view of the switchgear cabinet according to FIG. 1, wherein the covering element is attached in alternative fashion.

FIG. 2 shows a different variation for attaching the covering element 40 to the cabinet door 30. Here, the covering element 40 comprises two parts. One part carries the mating slot for the holding element 32 that is in the form of an angled section of the cabinet door 30. A vertical section 45a is arranged adjacent to the foot 45 that limits the holding element 32. The vertical section 45a carries the connecting element receptacle 50 which is open toward the front side of the frame. In this embodiment, the connecting element receptacle 50 is realized in the form of a blind dovetail groove, so that the mating connecting element 33 can be inserted into this dovetail groove. The connecting element 33 is connected to the second part of the covering element. A support section 51 is connected to the second part in order to positively fix the covering element 40 on the cabinet door 30. The support section 51 adjoins the front side of the cabinet door 30. The connecting element 33 can be pushed onto the connecting element receptacle 50 perpendicular to a plane of projection in order to connect both parts. A clip-type connection may also be realized if the geometry of the connecting element 33 is correspondingly changed or if a corresponding mating of materials is chosen.

What is claimed is:

1. In a switchgear cabinet having a hinged cabinet door (30) wherein a section located between an upper side of the switchgear cabinet and an upper horizontal edge of the cabinet door (30) is at least partially covered by a covering element (40), the improvement comprising:

the covering element (40) having a spacer (47) that moves onto a sliding surface (16) of the switchgear cabinet when the cabinet door (30) is closed.

2. In the switchgear cabinet according to claim 1, wherein the upper horizontal edge of the cabinet door (30) has an angled section that forms a holding element (32) for the covering element (40), and the covering element (40) contains a mating slot for the angled section.

3. In the switchgear cabinet according to claim 2, wherein insertion of the angled section into the spacer of the covering element (40) is limited by a limit stop (46), and the covering element (40) is positively held on the cabinet door (30) by a connecting element (33) and a connecting element receptacle (50).

4. In the switchgear cabinet according to claim 3, wherein the sliding surface (16) transitions into an inclined surface (48) of the covering element (40) toward the switchgear cabinet, wherein the inclined surface moves onto a horizontal edge (17) of a frame piece (10) that forms part of a frame.

5. In the switchgear cabinet according to claim 4, wherein the spacer (47) adjoins the switchgear cabinet in sealing fashion.

6. In the switchgear cabinet according to claim 5, wherein the covering element (40) contains a lettering strip receptacle (43).

7. In the switchgear cabinet according to claim 6, wherein the covering element (40) contains a first feed device (41) that diverts accumulating water into a collection channel (24) of the switchgear cabinet.

8. In the switchgear cabinet according to claim 7, wherein the collection channel (24) is formed by a downwardly directed second feed device and an upwardly directed endpiece (23) that is angularly connected to the second feed device, and the endpiece (23) protrudes into the spacer space (42) of the covering element.

9. In the switchgear cabinet according to claim 1, wherein the sliding surface (16) transitions into an inclined surface (48) of the covering element (40) toward the switchgear cabinet, wherein the inclined surface moves onto a horizontal edge (17) of a frame piece (10) that forms part of a frame.

10. In the switchgear cabinet according to claim 1, wherein the spacer (47) adjoins the switchgear cabinet in sealing fashion.

11. In the switchgear cabinet according to claim 1, wherein the covering element (40) contains a lettering strip receptacle (43).

12. In the switchgear cabinet according to claim 1, wherein the covering element (40) contains a foist feed device (41) that diverts accumulating water into a collection channel (24) of the switchgear cabinet.

\* \* \* \* \*